(12) United States Patent  
Kawanishi et al.

(10) Patent No.: US 11,858,421 B2  
(45) Date of Patent: Jan. 2, 2024

(54) VEHICLE MIRROR DEVICE

(71) Applicants: Misato Industries Co., Ltd., Fujioka (JP); TOYOTA JIDOSHA KABUSHIKI KAISHA, Toyota (JP)

(72) Inventors: Joichi Kawanishi, Kanagawa (JP); Yuto Watanabe, Kanagawa (JP); Takashi Nakatani, Kanagawa (JP); Takuro Yuyama, Kanagawa (JP); Ryosuke Iba, Kanagawa (JP); Tetsuya Nagasaki, Okazaki (JP)

(73) Assignees: Misato Industries Co., Ltd., Fujioka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 16/940,593

(22) Filed: Jul. 28, 2020

(65) Prior Publication Data

US 2021/0031688 A1    Feb. 4, 2021

(30) Foreign Application Priority Data

Jul. 29, 2019    (JP) .................................. 2019-138862

(51) Int. Cl.  
*B60R 1/06*    (2006.01)

(52) U.S. Cl.  
CPC ............ *B60R 1/06* (2013.01); *B60R 2300/10* (2013.01)

(58) Field of Classification Search  
CPC . B60R 1/06; B60R 2300/10; B60R 2300/103; B60R 2001/1253; B60R 1/12; B60R 1/1207

(Continued)

(56) References Cited

U.S. PATENT DOCUMENTS

2002/0118282 A1    8/2002    Nakamura  
2003/0098908 A1*   5/2003    Misaiji ................ B60R 11/04  
                                                348/148

(Continued)

FOREIGN PATENT DOCUMENTS

JP    2003-159998 A    6/2003  
JP    2003-267140 A    9/2003

(Continued)

*Primary Examiner* — Balram T Parbadia  
*Assistant Examiner* — Rahman Abdur  
(74) *Attorney, Agent, or Firm* — Oblon, McClelland, Maier & Neustadt, L.L.P.

(57) ABSTRACT

A vehicle mirror device includes a housing; an imaging device including an image light acquisition unit disposed in a lower surface of the housing in a vehicle-mounted state; a light projection device including an infrared irradiation unit disposed in the lower surface of the housing and disposed side by side with the image light acquisition unit in the left-and-right direction; and a plate-like attachment member including a surface on which the imaging device and the light projection device are mounted, and attached to the housing to hold the imaging device and the light projection device between the attachment member and the housing, the imaging device and the light projection device being fastened to the attachment member with screw members in a first direction. The attachment member is configured such that the imaging device and the light projection device are mountable thereon in a second direction different from the first direction.

6 Claims, 9 Drawing Sheets

(58) Field of Classification Search
 USPC .......................................................... 359/838
 See application file for complete search history.

(56) References Cited

U.S. PATENT DOCUMENTS

| | | | |
|---|---|---|---|
| 2003/0214733 A1* | 11/2003 | Fujikawa | ................... B60R 1/00 |
| | | | 359/838 |
| 2005/0243172 A1 | 11/2005 | Takano et al. | |
| 2010/0238292 A1* | 9/2010 | Sato | .......................... B60R 1/00 |
| | | | 348/148 |
| 2014/0063233 A1 | 3/2014 | Henion et al. | |
| 2014/0375809 A1* | 12/2014 | Song | ....................... B60R 11/04 |
| | | | 348/148 |

FOREIGN PATENT DOCUMENTS

| | | |
|---|---|---|
| JP | WO 2005/080137 A1 | 9/2005 |
| JP | 2010-260371 A | 11/2010 |
| JP | 2012-116225 A | 6/2012 |
| JP | 2016-78558 A | 5/2016 |

\* cited by examiner

VEHICLE MIRROR DEVICE

CROSS-REFERENCE TO RELATED APPLICATIONS

The present application claims priority to and incorporates by reference the entire contents of Japanese Patent Application No. 2019-138862 filed in Japan on Jul. 29, 2019.

BACKGROUND OF THE INVENTION

1. Field of the Invention

The present invention relates to a vehicle mirror device.

2. Description of the Related Art

As a vehicle mirror device, for example, a structure is known in which an imaging device acquiring image light and a light projection device emitting infrared light are arranged in a housing holding a mirror (for example, see Japanese Patent Application Laid-open No. 2016-078558). The vehicle mirror device has a structure in which the imaging device and the light projection device are fixed on an under panel with a co-fastening boss and individual fixing bosses, and the under panel is fixed on the housing with a boss different from the bosses described above.

In the structure disclosed in Japanese Patent Application Laid-open No. 2016-078558, the imaging device is fixed with bosses attached in the direction along the inner surface of the under panel. For this reason, the imaging device is moved in a direction along the inner surface of the under panel, and mounted on the under panel such that the lens is located in a position overlapping an opening portion provided in the under panel. In such a mounting method, because it is impossible to move the imaging device in the thickness direction of the under panel, the surface of the lens exposed through the opening portion is recessed inward with respect to the outer surface of the under panel in the state in which the imaging device is mounted. In this case, it is difficult to align the outer surface of the under panel and the lens surface as the same design surface. The same as above is applicable to the structure of the light projection device.

The present invention has been made in view of the problem described above, and an object of the present invention is to provide a vehicle mirror device capable of easily aligning the outer surfaces of the imaging device and the light projection device and the surfaces of the attachment member and the housing as the same design surface.

SUMMARY OF THE INVENTION

According to an aspect of the present invention, a vehicle mirror device includes a housing, an imaging device, a light projection device, and an attachment member. The housing is attached to a side portion of a vehicle and holding a mirror. The imaging device is contained in the housing and includes an image light acquisition unit disposed in a lower surface of the housing in a vehicle-mounted state. The light projection device is contained in the housing and includes an infrared irradiation unit disposed in the lower surface of the housing and disposed side by side with the image light acquisition unit in a left-and-right direction in the vehicle-mounted state. The attachment member has a plate-like shape, includes a surface on which the imaging device and the light projection device are mounted, and is attached to the housing to hold the imaging device and the light projection device between the attachment member and the housing. The imaging device and the light projection device are fastened to the attachment member with fastening members in a first direction. The attachment member is configured such that the imaging device and the light projection device are mountable thereon in a second direction different from the first direction.

DETAILED DESCRIPTION OF THE PREFERRED EMBODIMENT

Figure 1:
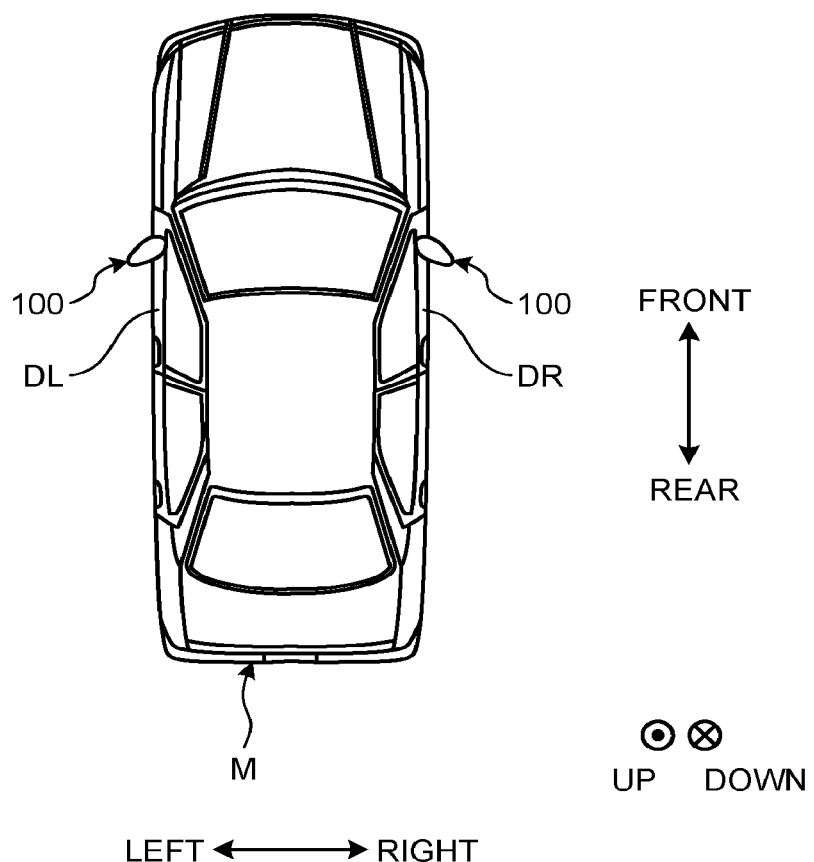
FIG. 1 is a plan view illustrating an example of a vehicle including a vehicle mirror device according to the present embodiment.

An embodiment according to the present invention will be described below with reference to drawings. The present invention is not limited to the embodiment. Constituent elements in the following embodiment include elements that can be easily replaced by those skilled in the art, or substantially the same ones.

In the following explanation, the front-and-rear direction, the up-and-down direction, and the left-and-right direction are directions in a vehicle-mounted state in which the vehicle mirror device is mounted on the vehicle, and indicate directions in the case of viewing an advancing direction of the vehicle from the driver's seat. In the present embodiment, the up-and-down direction is a direction parallel with the vertical direction, and the left-and-right direction is the horizontal direction. In the drawings, the view from top is referred to as "plan view", the view from the rear is referred to as "front view".

FIG. 1 is a plan view illustrating an example of a vehicle M including vehicle mirror devices 100 according to the present embodiment. As illustrated in FIG. 1, the vehicle mirror devices 100 are door mirrors, and attached to left and right doors DL and DR of the vehicle M outside the vehicle M. The left and right vehicle mirror devices 100 are substantially symmetrical in the left-and-right direction.

Figure 2:
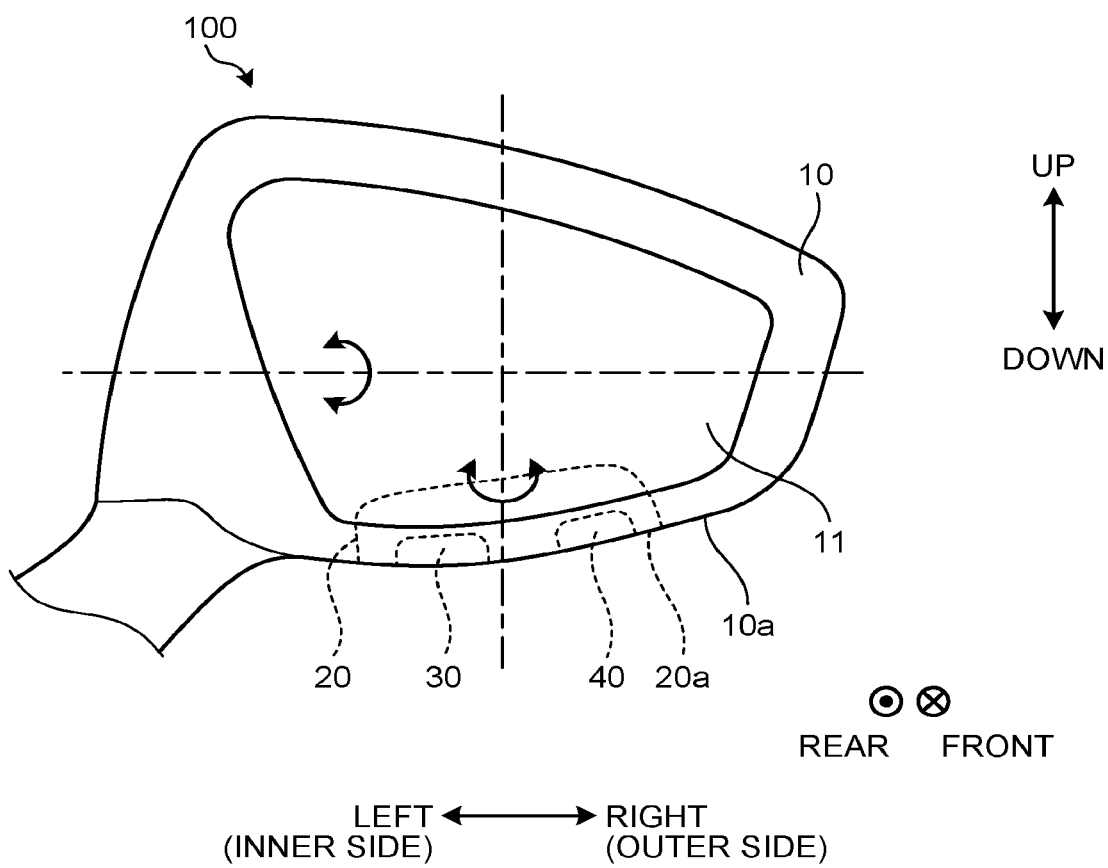
FIG. 2 is a front view of the vehicle mirror device according to the present embodiment.
Figure 3:
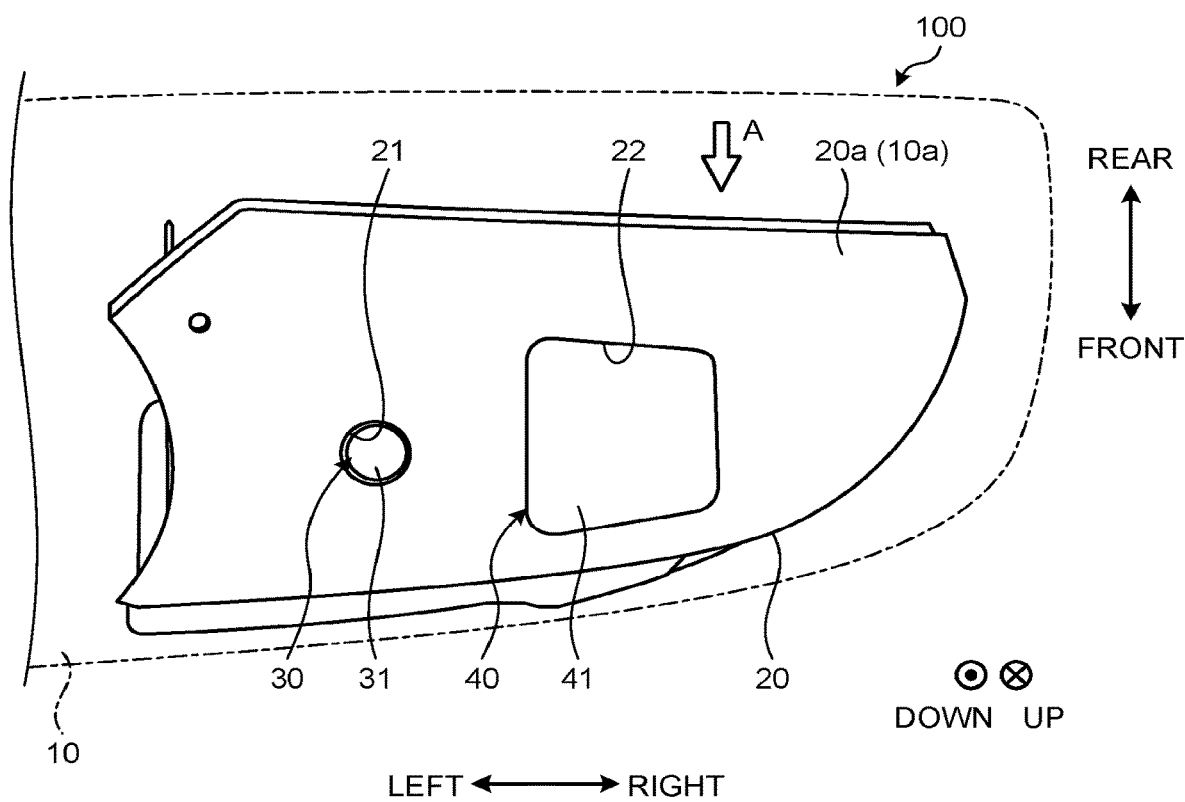
FIG. 3 is a diagram of the vehicle mirror device according to the present embodiment as viewed from the bottom.

FIG. 2 is a front view of the vehicle mirror device 100 according to the present embodiment. FIG. 3 is a diagram of the vehicle mirror device 100 according to the present embodiment as viewed from the bottom. FIG. 2 and FIG. 3 illustrate the vehicle mirror device 100 configured as a door mirror. FIG. 2 and FIG. 3 illustrate the right door mirror of the vehicle M illustrated in FIG. 1.

The vehicle mirror device 100 includes a housing 10, an attachment member 20, an imaging device 30, and a light projection device 40. The housing 10 is configured as a housing opened on the front side. The housing 10 is provided pivotably around an axis (vertical axis) parallel to the vertical with a rotation drive source (not illustrated).

The housing 10 holds a mirror 11. The mirror 11 is formed in a plate shape using, for example, glass or resin. The mirror 11 is supported by the housing 10 via a mirror drive unit (not illustrated). The mirror drive unit includes, for example, a drive source and a transmission mechanism (not illustrated), and changes the position of the mirror 11 by transmitting the driving force of the drive source to the mirror 11 with the transmission mechanism. The mirror 11 is provided rotatably around, for example, the vertical axis and an axis (horizontal axis) parallel to the horizontal direction. In this case, the horizontal axis may be, for example, an axis extending along the left-and-right direction. The housing 10 is attached to each of the left and right doors DL and DR of the vehicle M.

The attachment member 20 is attachable to and detachable from a lower portion of the housing 10 from the rear. The imaging device 30 and the light projection device 40 are fixed to the attachment member 20 with fastening members, such as screws. The attachment member 20 is attached to the housing 10, in the state in which the imaging device 30 and the light projection device 40 are fixed thereto.

The attachment member 20 includes a lower surface 20a. The lower surface 20a of the attachment member 20 is formed in a state curved upward, for example, in a direction from the vehicle inner side toward the vehicle outer side. The lower surface 20a of the attachment member 20 is in a state flush with a lower surface 10a of the housing 10. In the present embodiment, the lower surface 20a of the attachment member forms part of the lower surface 10a of the housing 10. Hereinafter, the lower surface 20a of the attachment member 20 is explained as part of the lower surface 10a of the housing 10. In the present embodiment, the lower surface 10a of the housing 10 including the lower surface 20a of the attachment member 20 is formed in a state curved upward in a direction from the vehicle inner side toward the vehicle outer side. The attachment member 20 includes an opening portion 21 through which an image light acquisition unit 31 of the imaging device 30 described later is exposed, and an opening portion 22 through which an infrared irradiation unit 41 of the light projection device 40 described later is exposed.

Figure 4:
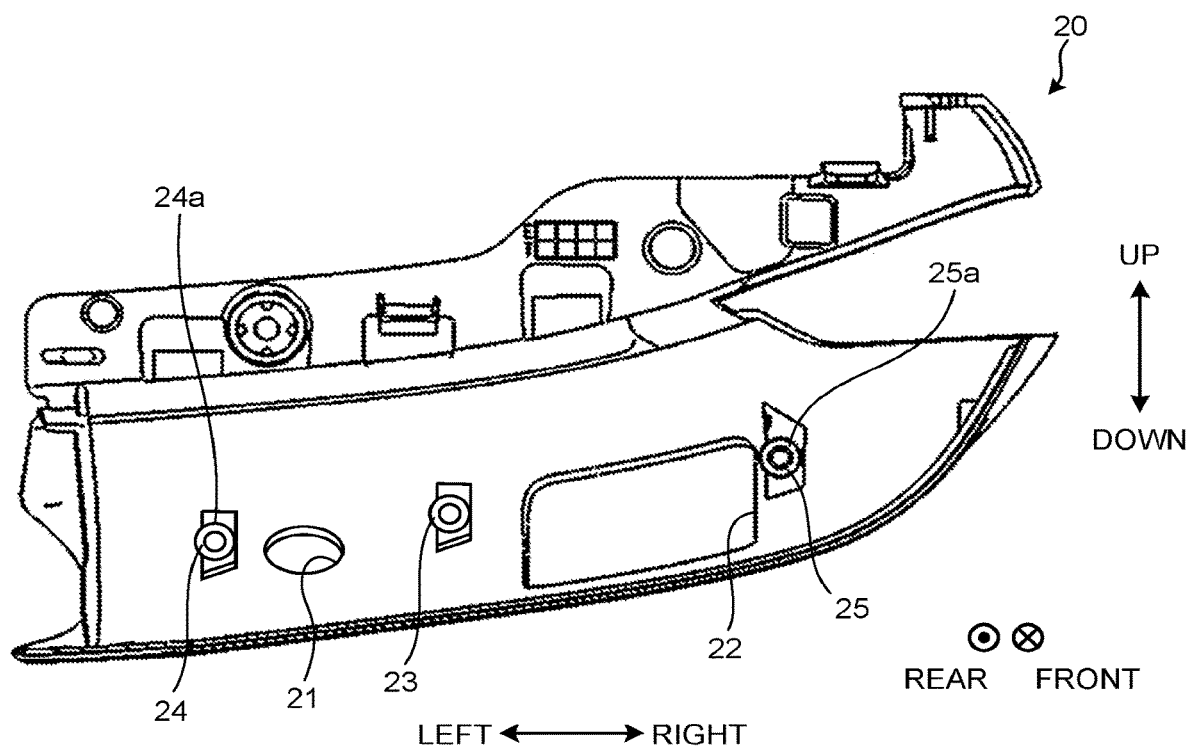
FIG. 4 is a diagram illustrating an example of an attachment member.
Figure 5:
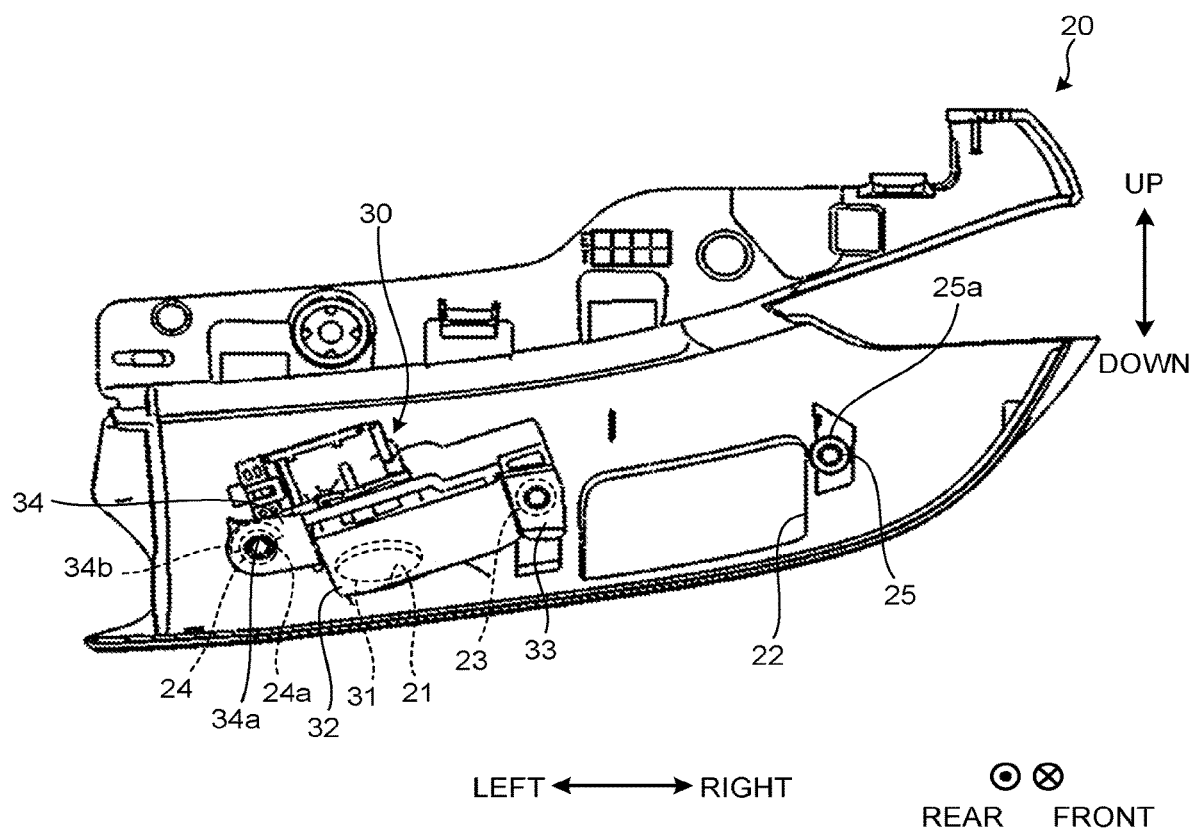
FIG. 5 is a diagram illustrating an example of the attachment member.
Figure 6:
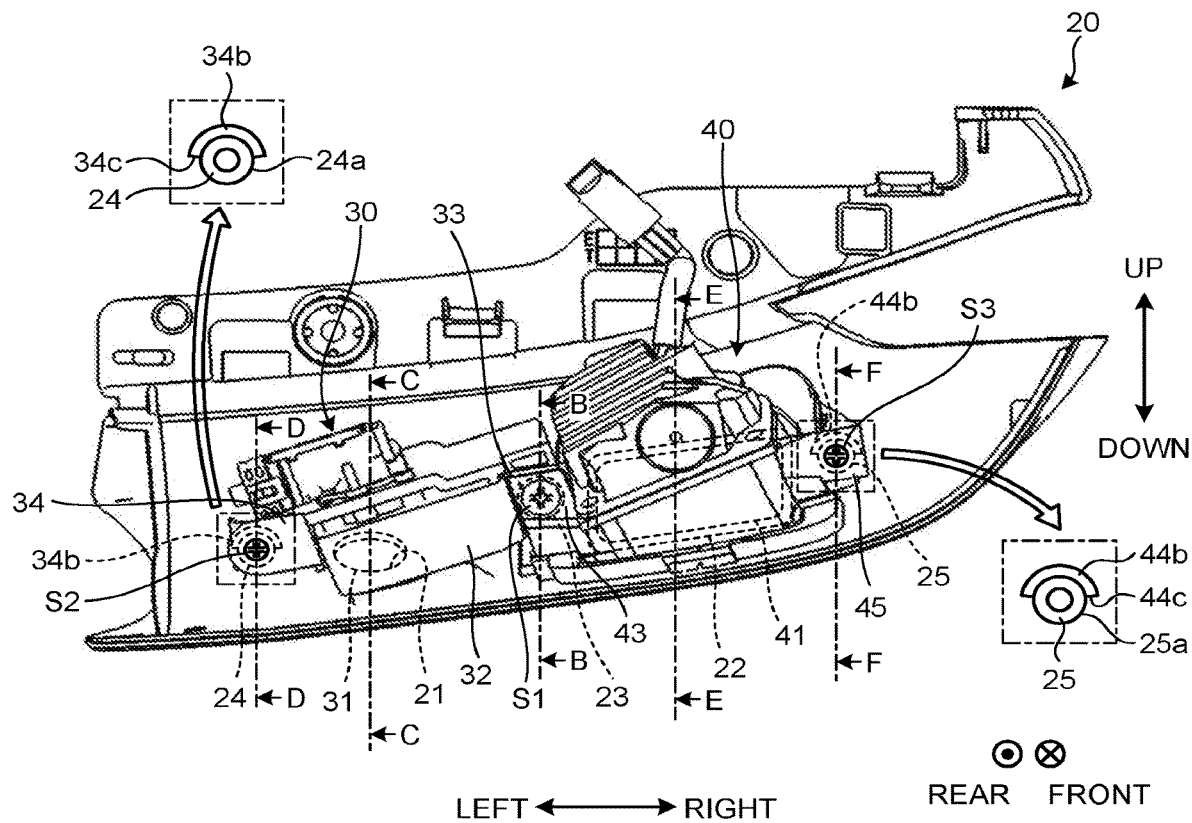
FIG. 6 is a diagram illustrating an example of the attachment member.

FIG. 4 to FIG. 6 are diagrams illustrating an example of the attachment member 20. FIG. 4 illustrates a state in which the imaging device 30 and the light projection device 40 are removed, and illustrates a structure as viewed in the direction of an arrow A in FIG. 3. FIG. 5 illustrates a state in which only the imaging device 30 is attached to the attachment member 20. FIG. 6 illustrates a state in which the imaging device 30 and the light projection device 40 are attached to the attachment member 20.

As illustrated in FIG. 4 to FIG. 6, the attachment member 20 includes screw receivers 23, 24, and 25 on an inner surface 20b thereof. The screw receivers 23, 24, and 25 are provided in a cylindrical shape to project rearward from the inner surface 20b (see FIG. 8 and FIG. 10). The screw receivers 23, 24, and 25 are arranged side by side, for example, in the left-and-right direction. Each of the screw receivers 23, 24, and 25 includes a recessed portion opened in a forward direction. The inner side surface of the recessed portion of each of the screw receivers 23, 24, and 25 are threaded.

A screw member (fastening member) S1 is screwed into the screw receiver 23. The screw member S1 is screwed from the rear to the front of the screw receiver 23 in a first direction D1 (see FIG. 7). A screw member (fastening member) S2 is screwed into the screw receiver 24. The screw member S2 is screwed from the rear to the front of the screw receiver 24 in the first direction D1 (see FIG. 9). A screw member (fastening member) S3 is screwed into the screw receiver 25. The screw member S3 is screwed from the rear to the front of the screw receiver 25 in the first direction D1 (see FIG. 11). Each of the screw members S1, S2, and S3 includes a head portion and a screw portion provided with thread.

The screw receiver 24 includes a cylindrical outer circumferential surface 24a. The outer circumferential surface 24a defines the position of a second portion 34 of the imaging device 30 described later. Accordingly, the outer circumferential surface 24a of the screw receiver 24 has a function as a positioning portion positioning the second portion 34 of the imaging device 30. In the same manner, the screw receiver 25 includes a cylindrical outer circumferential surface 25a. The outer circumferential surface 25a defines the position of a second portion 45 of the light projection device 40 described later. Accordingly, the outer circumferential surface 25a of the screw receiver 25 has a function as a positioning portion positioning the second portion 45 of the light projection device 40.

The imaging device 30 is attached to the housing 10 via the attachment member 20. The imaging device 30 is disposed on the vehicle inner side with respect to the light projection device 40. For example, an infrared camera or the like is used as the imaging device 30. The imaging device 30 acquires an image of the surroundings of the vehicle. The imaging device 30 includes the image light acquisition unit 31 acquiring image light PR, a frame portion 32 supporting the image light acquisition unit 31, and a first portion 33 and a second portion 34 disposed in the frame portion 32.

An optical member, such as a lens, is disposed in the image light acquisition unit 31. The image light acquisition unit 31 is disposed in a state exposed through the opening portion 21 in the lower surface 20a (lower surface 10a of the housing 10) of the attachment member 20.

Figure 8:
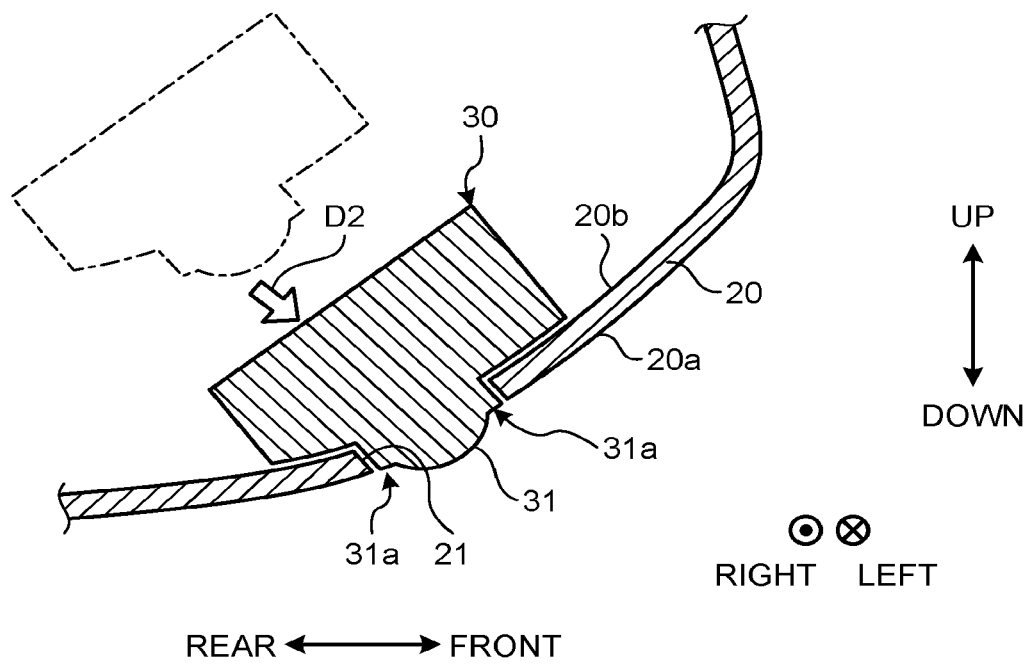
FIG. 8 is a diagram illustrating a structure along a C-C cross section in FIG. 6.

FIG. 8 is a diagram illustrating a structure along a C-C cross section in FIG. 6. As illustrated in FIG. 8, the imaging device 30 is mountable in a second direction D2 different from the first direction D1. The second direction D2 is a direction inclined with respect to the horizontal plane and extending from the top to the bottom in the vehicle-mounted state. The inner surface 20b of the attachment member 20 may be provided with a guide portion to guide the imaging device 30 in the second direction D2. In addition, for example, as illustrated in FIG. 8, the opening direction of the opening portion 21 may be a direction along the second direction D2. In this case, when the image light acquisition unit 31 is inserted into the opening portion 21, the image light acquisition unit 31 can be guided in a direction along the second direction D2.

In addition, the imaging device 30 includes an edge portion 31a in a peripheral edge portion of the image light acquisition unit 31. The edge portion 31a is formed to be flush with the lower surface 20a of the attachment member 20 when the imaging device 30 is mounted on the attachment member 20. Providing the edge portion 31a secures the same design surface between an outer surface of the imaging device 30 exposed through the opening portion 21 of the attachment member 20 and the lower surface 20*a* of the attachment member 20. The image light acquisition unit 31 projects downward from the edge portion 31*a*, and projects from the lower surface 20*a* of the attachment member 20. This structure enables acquisition of image light from a wide range while securing the same design surface between the edge portion 31*a* of the imaging device 30 and the lower surface 20*a* of the attachment member 20.

The frame portion 32 extends in the left-and-right direction in the vehicle-mounted state. The frame portion 32 includes the first portion 33 and the second portion 34. The first portion 33 is disposed in a vehicle outer end portion of the frame portion 32 in the vehicle-mounted state. The first portion 33 extends toward the vehicle outer side from the frame portion 32.

Figure 7:
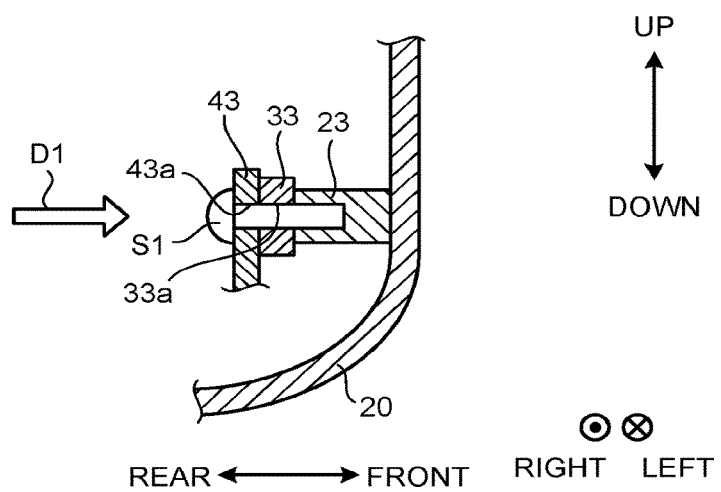
FIG. 7 is a diagram illustrating a structure along a B-B cross section in FIG. 6.

FIG. 7 is a diagram illustrating a structure along a B-B cross section in FIG. 6. As illustrated in FIG. 7, the first portion 33 includes a through hole 33*a* through which the screw portion of the screw member S1 is inserted. The through hole 33*a* has a diameter larger than the diameter of the screw portion of the screw member S1, and smaller than the diameter of the head portion of the screw member S1. The screw member S1 is screwed into the through hole 33*a* and the recessed portion of the screw receiver 23 in the first direction D1. In this manner, the first portion 33 is fastened to the attachment member 20 with the screw member S1 in the first direction D1.

The second portion 34 is disposed in a vehicle inner end portion in the frame portion 32 in the vehicle-mounted state. The second portion 34 extends toward the vehicle inner side from the frame portion 32. The second portion 34 includes a through hole 34*a* through which the screw portion of the screw member S2 is inserted, and a locked portion 34*b* locked on the screw receiver 24. The through hole 34*a* has a diameter larger than the diameter of the screw portion of the screw member S2, and smaller than the diameter of the head portion of the screw member S2.

By locking the locked portion 34*b* on the screw receiver 24, the frame portion 32 is positioned. FIG. 6 illustrates the structure on the back side (front side in the vehicle-mounted state) of the second portion 34 in an enlarged view. As illustrated in FIG. 6, the locked portion 34*b* is provided to be locked on the upper portion of the screw receiver 24. The locked portion 34*b* has a structure including a cutout portion 34*c* on a lower end side serving as a distal end side of the second direction D2. With the locked portion 34*b* locked on the screw receiver 24, the through hole 34*a* is disposed in a position overlapping the recessed portion of the screw receiver 24 as viewed from the rear.

Figure 9:
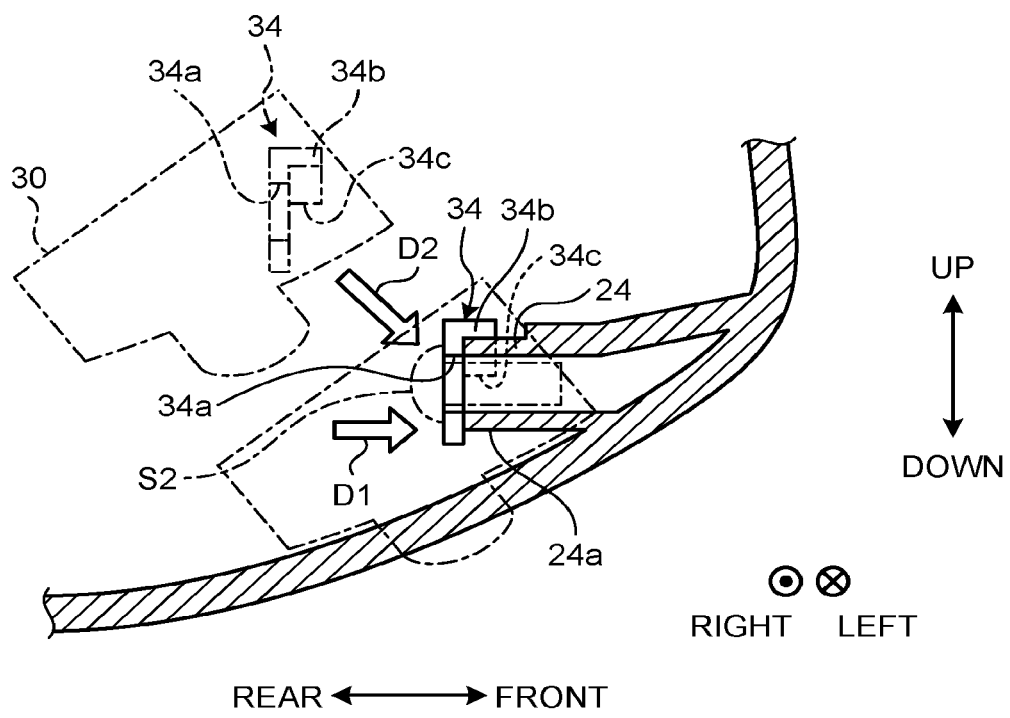
FIG. 9 is a diagram illustrating a structure along a D-D cross section in FIG. 6.

FIG. 9 is a diagram illustrating a structure along a D-D cross section in FIG. 6. As illustrated in FIG. 9, the locked portion 34*b* is in a state in which the lower side is cut out. For this reason, when the imaging device 30 is attached in the second direction D2, the locked portion 34*b* is prevented from interfering with other regions, such as the screw receiver 24. In addition, the screw member S2 is screwed into the through hole 34*a* and the recessed portion of the screw receiver 24 in the first direction D1. In this manner, the second portion 34 is fastened to the attachment member 20 with the screw member S2 in the first direction D1.

The light projection device 40 is attached to the housing 10 via the attachment member 20. The light projection device 40 is disposed on the vehicle outer side with respect to the imaging device 30. The light projection device 40 includes the infrared irradiation unit 41 emitting infrared light IR and a frame portion 42 supporting the infrared irradiation unit 41.

The infrared irradiation unit 41 is disposed in a state of being exposed through the opening portion 22 in the lower surface 20*a* (lower surface 10*a* of the housing 10) of the attachment member 20. The infrared irradiation unit 41 is disposed side by side with the image light acquisition unit 31 in the left-and-right direction.

Figure 10:
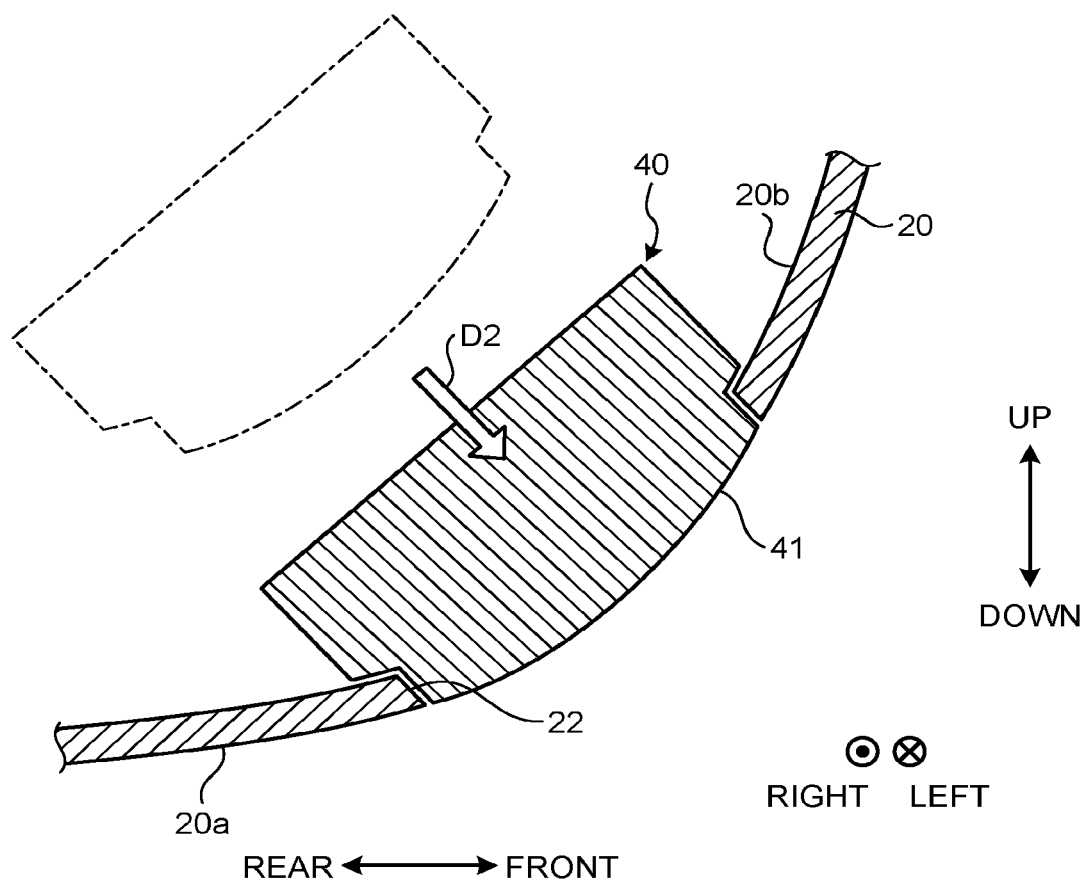
FIG. 10 is a diagram illustrating a structure along an E-E cross section in FIG. 6.

FIG. 10 is a diagram illustrating a structure along an E-E cross section in FIG. 6. As illustrated in FIG. 10, the light projection device 40 is provided to be mountable in the second direction D2 different from the first direction D1. The inner surface 20*b* of the attachment member 20 may be provided with a guide portion to guide the light projection device 40 in the second direction D2. In addition, for example, as illustrated in FIG. 10, the opening direction of the opening portion 22 may be a direction along the second direction D2. In this case, when the infrared irradiation unit 41 is inserted into the opening portion 22, the infrared irradiation unit 41 can be guided in a direction along the second direction D2. The infrared irradiation unit 41 is provided in a state flush with the lower surface 20*a* of the attachment member 20. This structure secures the same design surface between an outer surface of the light projection device 40 exposed through the opening portion 22 of the attachment member 20 and the lower surface 20*a* of the attachment member 20.

As illustrated in FIG. 6, the frame portion 42 extends in the left-and-right direction in the vehicle-mounted state. The frame portion 42 includes a first portion 43 and a second portion 44. The first portion 43 is disposed in a vehicle inner end portion of the frame portion 42 in the vehicle-mounted state. The first portion 43 extends toward the vehicle inner side from the frame portion 42. The first portion 43 includes a through hole 43*a*. The through hole 43*a* has a diameter larger than the diameter of the screw portion of the screw member S1, and smaller than the diameter of the head portion of the screw member S1.

As illustrated in FIG. 7, the first portion 43 includes the through hole 43*a* through which the screw portion of the screw member S1 is inserted. The diameter of the through hole 43*a* is larger than the diameter of the screw portion of the screw member S1, and smaller than the diameter of the head portion of the screw member S1. The screw member S1 is screwed into the through hole 43*a* and the recessed portion of the screw receiver 23 in the first direction D1. In this manner, the first portion 43 of the light projection device 40 is fastened (co-fastened) to the attachment member 20 with the screw member S1 together with the first portion 33 of the imaging device 30 in the first direction D1.

As illustrated in FIG. 6, the second portion 44 is disposed in a vehicle outer end portion in the frame portion 42 in the vehicle-mounted state. The second portion 44 extends toward the vehicle outer side from the frame portion 42. The second portion 44 includes a through hole 44*a* through which the screw portion of the screw member S3 is inserted, and a locked portion 44*b* locked on the screw receiver 25. The through hole 44*a* has a diameter larger than the diameter of the screw portion of the screw member S3, and smaller than the diameter of the head portion of the screw member S3.

By locking the locked portion 44*b* on the screw receiver 25, the frame portion 42 is positioned. FIG. 6 illustrates the structure on the back side (front side in the vehicle-mounted state) of the second portion 44 in an enlarged view. As illustrated in FIG. 6, the locked portion 44*b* is provided to be locked on the upper portion of the screw receiver 25. The locked portion 44b has a structure including a cutout portion 44c on a lower end side serving as a distal end side of the second direction D2. With the locked portion 44b locked on the screw receiver 25, the through hole 44a is disposed in a position overlapping the recessed portion of the screw receiver 25 as viewed from the rear.

Figure 11:
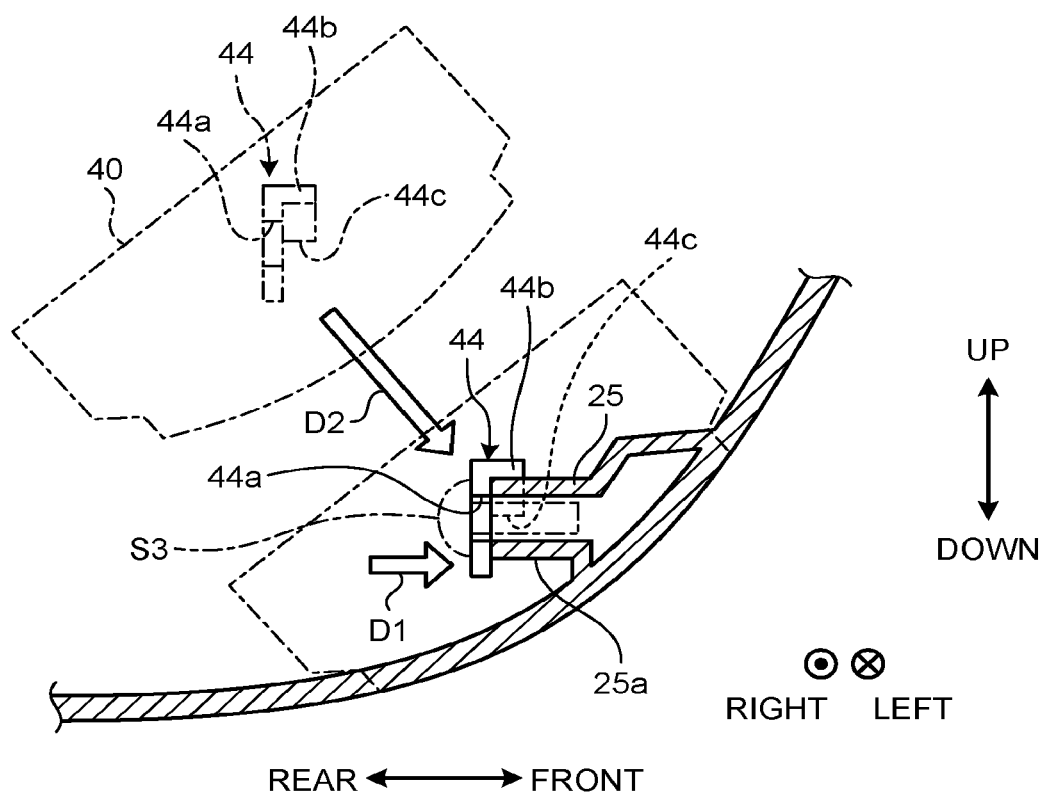
FIG. 11 is a diagram illustrating a structure along an F-F cross section in FIG. 6.

FIG. 11 is a diagram illustrating a structure along an F-F cross section in FIG. 6. As illustrated in FIG. 11, the locked portion 44b is in a state in which the lower side is cut out. For this reason, when the light projection device 40 is attached in the second direction D2, the locked portion 44b is prevented from interfering with other regions, such as the screw receiver 25. In addition, the screw member S3 is screwed into the through hole 44a and the recessed portion of the screw receiver 25 in the first direction D1. In this manner, the second portion 44 is fastened to the attachment member 20 with the screw member S3 in the first direction D1.

When manufacturing the vehicle mirror device 100 structured as described above, first, the imaging device 30 is mounted on the attachment member 20. In this case, the imaging device 30 is mounted in the second direction D2 different from the fastening direction of the screw members S1 and S2. In the present embodiment, the imaging device 30 has a structure including the cutout portion 34c on the lower end side serving as the distal end side of the second direction D2, in the locked portion 34b of the second portion 34 of the frame portion 32. This structure enables the locked portion 34b to be locked on the screw receiver 24 without interfering with the screw receiver 24. As described above, by mounting the imaging device 30 in a direction different from the fastening direction of the screw members S1 and S2, the position of the surface of the imaging device 30 can be adjusted in a direction different from the first direction D1 according to the position of the lower surface 20a of the attachment member 20. This structure enables the imaging device 30 to be mounted such that the edge portion 31a is flush with the lower surface 20a of the attachment member 20. Mounting the imaging device 30 as described above secures the same design surface between the outer surface of the imaging device 30 and the lower surface 20a of the attachment member 20.

Thereafter, the light projection device 40 is mounted on the attachment member 20. Also when mounting the light projection device 40, the light projection device 40 is mounted in the second direction D2 different from the fastening direction of the screw members S1 and S3. In the present embodiment, the light projection device 40 has a structure including the cutout portion 44c on the lower end side serving as the distal end side of the second direction D2, in the locked portion 44b of the second portion 44 of the frame portion 42. This structure enables the locked portion 44b to be locked on the screw receiver 25 without interfering with the screw receiver 25. By mounting the light projection device 40 in a direction different from the fastening direction of the screw members S1 and S3, the position of the surface of the light projection device 40 can be adjusted in a direction different from the first direction D1 according to the position of the lower surface 20a of the attachment member 20. This structure enables the light projection device 40 to be mounted such that the infrared irradiation unit 41 is flush with the lower surface 20a of the attachment member 20. Mounting the light projection device 40 as described above secures the same design surface between the outer surface of the light projection device 40 and the lower surface 20a of the attachment member 20.

Thereafter, the screw members S1, S2, and S3 are screwed in the first direction D1. In this manner, the imaging device 30 and the light projection device 40 are fastened to the attachment member 20 with the screw members S1, S2, and S3 in the first direction D1. Thereafter, the attachment member 20 to which the imaging device 30 and the light projection device 40 are attached is mounted on the housing 10. In this case, the attachment member 20 is mounted on the housing 10 such that the lower surface 20a of the attachment member 20 is flush with the lower surface 10a of the housing 10. This structure secures the same design surface between the lower surface 10a of the housing 10, the lower surface 20a of the attachment member 20, the outer surface of the imaging device 30, and the outer surface of the light projection device 40.

As described above, the vehicle mirror device 100 according to the present embodiment includes the housing 10 attached to a side portion of the vehicle and holding a mirror, the imaging device 30 contained in the housing 10 and including the image light acquisition unit 31 disposed in the lower surface 10a of the housing 10 in a vehicle-mounted state, the light projection device 40 contained in the housing 10 and including the infrared irradiation unit 41 disposed in the lower surface 10a of the housing 10 and disposed side by side with the image light acquisition unit 31 in the left-and-right direction in the vehicle-mounted state, and the attachment member 20 having a plate-like shape, including the inner surface 20b on which the imaging device 30 and the light projection device 40 are mounted, and attached to the housing 10 to hold the imaging device 30 and the light projection device 40 between the attachment member 20 and the housing 10. The imaging device 30 and the light projection device 40 are fastened to the attachment member 20 with the screw members S1, S2, and S3 in the first direction D1. The attachment member 20 is configured such that the imaging device 30 and the light projection device 40 are mountable thereon in the second direction D2 different from the first direction D1.

This structure enables adjustment of the positions of the surfaces of the imaging device 30 and the light projection device 40 in a direction different from the first direction D1 according to the position of the lower surface 20a of the attachment member 20, by mounting the imaging device 30 and the light projection device 40 in the second direction D2 different from the first direction D1 serving as the fastening direction of the screw members S1, S2, and S3. This structure enables the surfaces of the imaging device 30 and the light projection device 40 to be easily flush with the lower surface 20a of the attachment member 20, and easily secures the same design surface between them.

In the vehicle mirror device 100 according to the present embodiment, the first direction D1 is a direction along a horizontal plane in the vehicle-mounted state, and the second direction D2 is a direction inclined with respect to the horizontal plane and extending from the top to the bottom in the vehicle-mounted state. This structure enables easy adjustment of the surfaces of the imaging device 30 and the light projection device 40 in the vertical direction.

In the vehicle mirror device 100 according to the present embodiment, the infrared irradiation unit 41 is provided in a state flush with the lower surface 20a of the attachment member 20. This structure secures the same design surface between the outer surface of the light projection device 40 exposed through the opening portion 22 of the attachment member 20 and the lower surface 20a of the attachment member 20.

In the vehicle mirror device 100 according to the present embodiment, the image light acquisition unit 31 projects downward from the edge portion 31a, and projects from the lower surface 20a of the attachment member 20. This structure enables acquisition of image light from a wide range while securing the same design surface between the edge portion 31a of the imaging device 30 and the lower surface 20a of the attachment member 20.

In the vehicle mirror device 100 according to the present embodiment, the attachment member 20 includes the screw receivers 24 and 25 serving as positioning portions positioning the imaging device 30 and the light projection device 40, the imaging device 30 and the light projection device 40 include locked portions 34b and 44b locked on the screw receivers 24 and 25, respectively, and the locked portions 34b and 44b include cutout portions 34c and 44c on the distal end side of the second direction D2, respectively. This structure enables the locked portions 34b and 44b to be locked on the screw receivers 24 and 25 without interfering with the screw receivers 24 and 25.

The present invention enables easy alignment of the outer surfaces of the imaging device and the light projection device and the surfaces of the attachment member and the housing as the same design surface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle mirror device, comprising:
    a housing attached to a side portion of a vehicle and holding a mirror;
    an imaging device contained in the housing and including an image light acquisition unit disposed in a lower surface of the housing in a vehicle-mounted state;
    a light projection device contained in the housing and including an infrared irradiation unit disposed in the lower surface of the housing and disposed side by side with the image light acquisition unit in a left-and-right direction in the vehicle-mounted state; and
    an attachment member having a plate-like shape, including a first surface on which the imaging device and the light projection device are mounted, and detachably attached to the housing to hold the imaging device and the light projection device between the attachment member and the housing, the imaging device and the light projection device being fastened to the attachment member with screw members, a screwing direction of the screw members being a first direction which is a direction parallel to a horizontal plane of the vehicle in the vehicle-mounted state, wherein
    the attachment member is configured such that the imaging device and the light projection device are mountable thereon in a second direction different from the first direction, and
    a lower surface of the attachment member is flush with the lower surface of the housing, the lower surface of the attachment member being a surface opposite to the first surface.

2. The vehicle mirror device according to claim 1, wherein the infrared irradiation unit is provided in a state flush with a lower surface of the attachment member.

3. The vehicle mirror device according to claim 1, wherein the image light acquisition unit projects from a lower surface of the attachment member.

4. The vehicle mirror device according to claim 1, wherein
    the attachment member includes a positioning portion that positions the imaging device and the light projection device,
    the imaging device and the light projection device each include a locked portions locked on the positioning portion, and
    the locked portion includes a cutout portion on a distal end side in the second direction.

5. The vehicle mirror device according to claim 1, wherein
    when the imaging device and the light projection device are both mounted on the attachment member and the attachment member is attached to the housing, the lower surface of the housing, the lower surface of the attachment member, an outer surface of the imaging device, and an outer surface of the light projection device all share a same design surface.

6. The vehicle mirror device according to claim 1, wherein the second direction is inclined with respect to the horizontal plane in the vehicle-mounted state and extending top to bottom in the vehicle-mounted state.

* * * * *